United States Patent [19]
Thayer

[11] Patent Number: 5,335,489
[45] Date of Patent: Aug. 9, 1994

[54] GAS TURBINE VECTORING EXHAUST NOZZLE

[75] Inventor: Edward B. Thayer, Palm Beach Gardens, Fla.

[73] Assignee: United Technologies Corporation, Hartford, Conn.

[21] Appl. No.: 89,921

[22] Filed: Jul. 9, 1993

[51] Int. Cl.⁵ ............................................. F02K 1/12
[52] U.S. Cl. .................................. 60/230; 60/266; 239/265.17; 239/265.37
[58] Field of Search ............... 60/230, 232, 262, 266; 239/265.17, 265.35, 265.37, 265.39

[56] References Cited

U.S. PATENT DOCUMENTS

| | | |
|---|---|---|
| 2,846,844 | 8/1958 | O'Rourke ............................ 60/35.54 |
| 3,004,385 | 10/1961 | Spears, Jr. et al. ................. 60/35.6 |
| 4,037,405 | 7/1977 | Huenninger et al. ................. 60/230 |
| 4,043,509 | 8/1977 | McHugh et al. ................ 239/265.41 |
| 4,502,636 | 3/1985 | Nightingale et al. .......... 235/265.17 |
| 4,778,109 | 10/1988 | Jourdain et al. ..................... 60/230 |
| 4,819,876 | 4/1989 | Thayer ................................. 60/232 |
| 4,994,660 | 2/1991 | Hauer ................................... 60/230 |
| 5,050,803 | 9/1991 | Wakeman et al. .................... 60/230 |
| 5,082,182 | 1/1992 | Bruchez, Jr. et al. .......... 239/265.35 |

*Primary Examiner*—Louis J. Casaregola
*Attorney, Agent, or Firm*—Edward L. Kochey, Jr.

[57] ABSTRACT

An exhaust nozzle has variable convergent flaps, ejector flaps, and short divergent flaps spaced inwardly from the ejector flaps, cooling air is introduced through the opening between the divergent and ejector flaps. When the nozzle is vectored, the size of the opening is increased in the region of the nozzle experiencing higher static pressure.

9 Claims, 4 Drawing Sheets

GAS TURBINE VECTORING EXHAUST NOZZLE

TECHNICAL FIELD

The invention relates to vectoring nozzles for aircraft jet engines and in particular to ejector nozzles where cooling airflow is induced to cool the exhaust structure.

BACKGROUND OF THE INVENTION

Cooling air is frequently used to cool the materials of the exhaust nozzles used in gas turbine engines. Frequently, fan air is used where considerable pressure is available to direct and modulate the cooling airflow.

In engines with high fan pressure ratios the cooling air is extensively compressed and therefore at an elevated temperature. Accordingly, it is difficult to achieve adequate cooling with this higher temperature air.

It is known therefore, to design the nozzle as an ejector whereby cooling air can be induced at the throat plane. Ambient air enters the ram duct and is induced from there into the nozzle adjacent the surfaces. It can be appreciated that very little excess pressure is available with this arrangement.

When nozzles are used requiring pitch or yaw, a backflow of hot gases occurs into the ejection area before any significant amount of vectoring occurs. It is desirable to eject cooling air in a manner that maintains the flow of cooling air despite vectoring operation of the nozzles.

SUMMARY OF THE INVENTION

Nozzle cooling air is induced through an opening between the divergent flaps and the ejector flaps. As these flaps are moved to effect thrust vectoring, the opening increases in the region where the ejector flaps are deflected into the engine flow. The increased cooling air opening in this higher static pressure region minimizes the possibility of impingement and backflow of the primary flow on the ejector flap system.

The non-vectorable convergent flap means defines a variable throat area. Short divergent flaps are pivotally connected to the downstream end of the convergent flaps. Ejector flaps are located outboard of the divergent flaps and are supported from pivot connections which are secured to the convergent flaps. The ejector flap pivot connections are located outboard of the convergent flaps and downstream of the divergent flap pivot. Link means are supplied for maintaining the ejector flap means and divergent flap means substantially parallel to each other during both dry and afterburning operation.

DESCRIPTION OF THE PREFERRED EMBODIMENT

Figure 1:
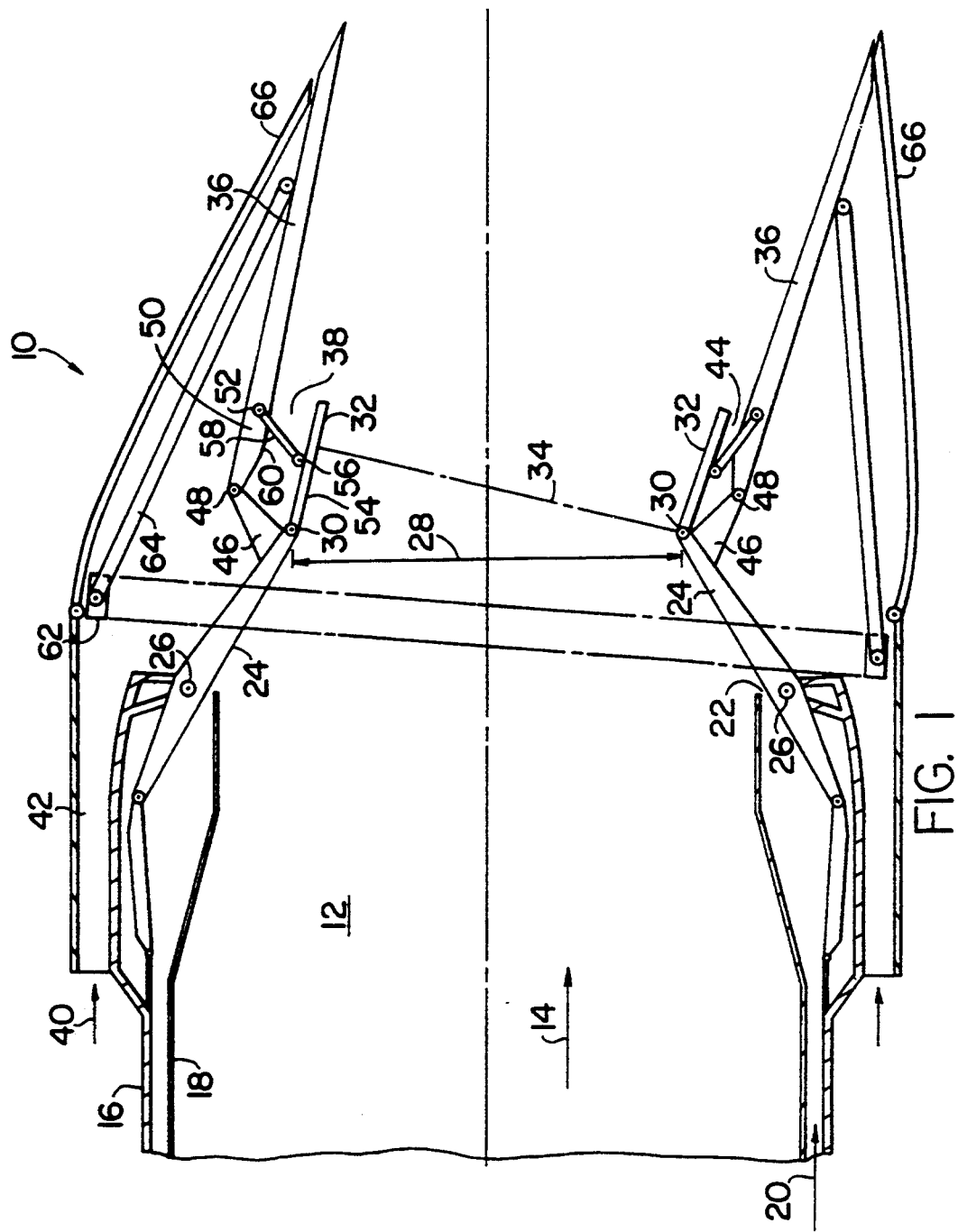
FIG. 1 shows the nozzle at dry power, downwardly vectored.

Referring to FIG. 1, exhaust nozzle 10 is secured to the end of exhaust duct 12 carrying gas turbine exhaust gas 14. Between the outer wall 16 of the duct and liner 18, there is a flow of fan air 20 passing through opening 22 to cool convergent flap 24.

The nozzle illustrated is axisymmetric although the invention would be also applicable to a 2-D nozzle. Each convergent flap 24 will pivot around support 26 varying the size of the throat area 28.

Divergent flap pivot connections 30 are located at the downstream end of the convergent flaps 24. Short divergent flaps 32 are connected to the divergent flap pivot connections and extend downstream therefrom. The short divergent flaps provide sufficient turning of the primary flow during vectoring and keep the high pressure throat plane 34 away from the ejector flap 36. These flaps should be sufficiently long that this plane falls within the flap 32. It can be located by a line from pivot point 30 perpendicular to the opposite flap 32.

A plurality of ejector flaps 36 are located outboard of and concentrically surrounding the divergent flaps. An opening 38 is thereby formed for the induction of cooling air. Such induced cooling air would cool the outside surface of divergent flaps 32 and the gas side surface of injector flaps 36.

Ram air 40 passes through cooling air duct 42 to the opening 38. It is pointed out that opening 38 as shown on the upper portion of FIG. 1 is wider than opening 44 on the lower edge of the Figure. This is accomplished by the linkage between divergent flap 32 and injector flap 36.

The four bar linkage connecting these includes first link 46 rigidly secured to convergent flap 24. Ejector flap pivot connections 48 are located on this first link, being located aft of divergent flap pivot connections 30. A second link 50 comprises that portion of ejector flap 36 between the pivot point 48 and pin connection 52. The third link 54 is comprised of that portion of divergent flap 32 between the divergent flap pivot connections 30 and pin connection 56. The fourth link 58 is located between pin connections 52 and 56.

The first link 46 and the fourth link 58 are of equal length. Also, the second link 50 and the third link 54 are of equal length.

The ejector flap 36 and the divergent flap 32 are thereby maintained parallel to each other. The ejector flap pivot connection 48 is preferably located in a line through the divergent flap point connection 30 which is perpendicular to the divergent flaps 32, 36 when the divergent flaps are at the maximum vectoring position away from that particular side of the nozzle. In this manner the opening 38 increases as the flaps are vectored away from that side of the nozzle and decreases when the flaps are vectored toward that side.

When vectoring away, the impact of the gases builds up the static pressure thereby deterring the flow of cooling air. This is compensated for, to some extent, by an increase in the flow area 38 at that time.

Synch ring 62 is connected through ejector bars 64 to each ejector flap 36. Movement of the synch ring 62 fore and aft increases then decreases the opening at the outlet of the ejector flaps. Through the linkage connection the same increase and decrease of area occurs at the exit of the divergent flaps.

Tilting the synch ring 62 in any direction will move both the ejector flaps and the divergent flaps away from the side of the nozzle at which the synch ring moves rearwardly. Conversely, the other side of the ring moving forwardly draws the flaps toward that side of the nozzle. Opening and vectoring of the nozzles can thereby be controlled.

Fairing flaps 66 are located outboard of the ejector flaps to minimize boat tail drag.

In FIG. 1, the synch ring 62 is tilted to effect a downward thrust with increased cooling air passing through opening 38 as compared to opening 44.

Figure 2:
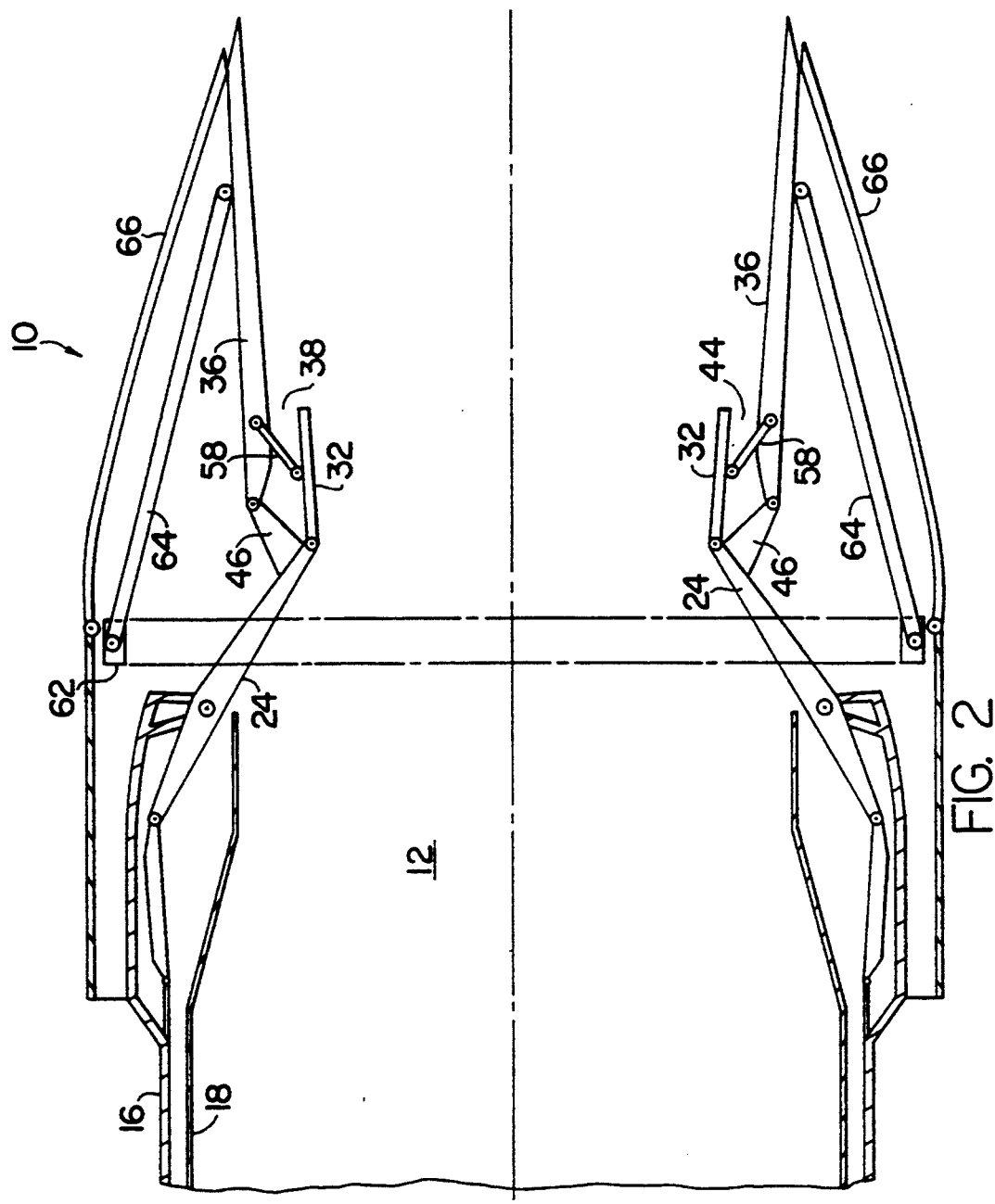
FIG. 2 shows the nozzle at dry power, unvectored.

In FIG. 2, the nozzle 10 is also shown at dry power. Here, however, synch ring 62 is in the vertical position and no thrust vectoring is being effected. Openings 38 and 44 are here equal providing uniform cooling air around the entire periphery.

Figure 3:
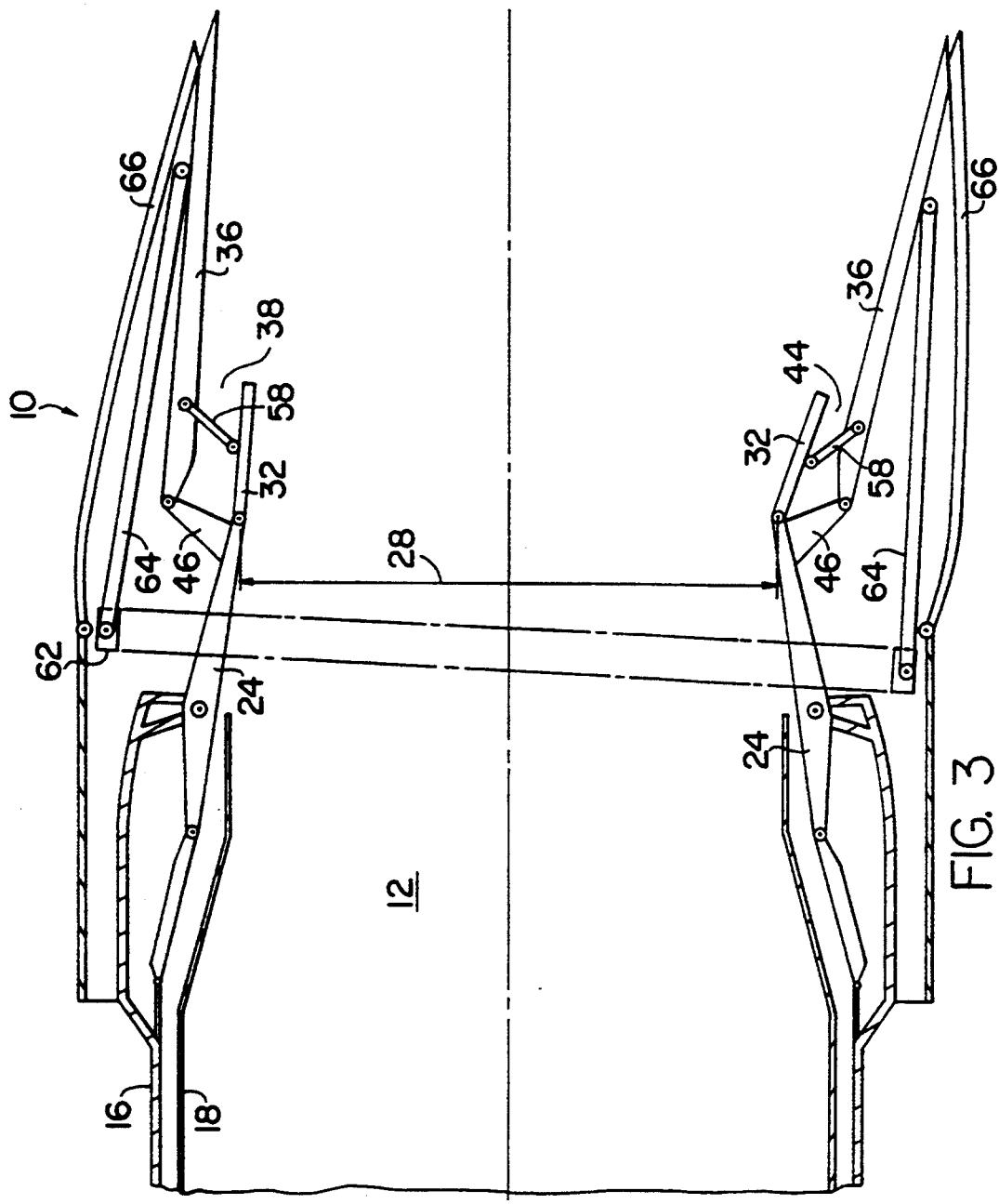
FIG. 3 shows the nozzle during augmented operation and downwardly vectored.

FIG. 3 illustrates the nozzle with augmentation or afterburning and with downward thrust. Since the throat 28 must be opened wider for augmented operation, less vectoring is available. However, it can be seen hereto that the opening 38 is wider than opening 44 providing an increased cooling airflow against the impact inside of the ejector flap 36.

Figure 4:
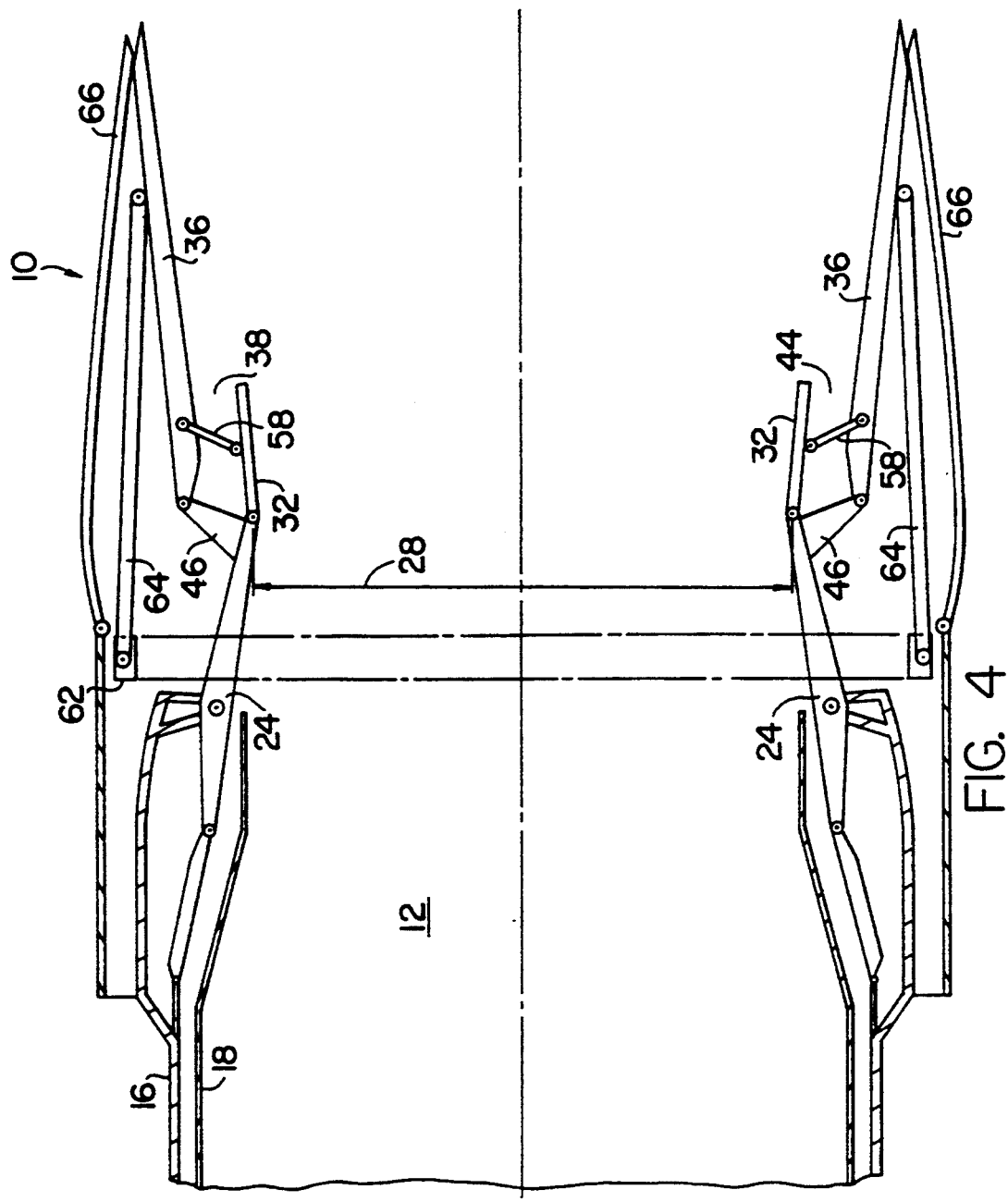
FIG. 4 shows the nozzle during augmented operation in the unvectored condition.

FIG. 4 illustrates the nozzle operating augmented without vectoring. Vectoring ring 62 has been withdrawn to open the exhaust area, but remains vertical so that the size Of the opening 38 is equal to opening 44.

I claim:

1. An exhaust nozzle for an aircraft gas turbine engine comprising:
   convergent flap means defining a variable throat area;
   divergent flap pivot connections at the downstream end of said convergent flap means;
   divergent flap means connected to said divergent flap pivot connections, and extending downstream therefrom;
   ejector flap pivot connections rigidly supported from said convergent flap means outboard of said convergent flap means;
   ejector flap means connected at their upstream end to said ejector flap pivot connections;
   a ram air supply duct connected to deliver ram air between said divergent flap means and said ejector flap means;
   vector drive means for vectoring said ejector flap means to various selected vector angles; and
   link means for maintaining said ejector flap means and said divergent flap means substantially parallel to each other.

2. A nozzle as in claim 1 comprising also:
   said ejector flap pivot connections located downstream of said divergent flap pivot connections.

3. A nozzle as in claim 2, comprising also:
   said ejector flap pivot connections located on a line through said divergent flap pivot connections and perpendicular to said divergent flap means when said divergent flap means are at the maximum vectoring position away from the side of the nozzle on which the particular divergent flap means is located.

4. A nozzle as in claim 1, comprising also:
   said link means comprising a four bar linkage comprised of a first link from said divergent flap pivot connections to said ejector flap pivot connections;
   a second link from said ejector flap pivot connections to a pin connection on said ejector flap means, a third link from said divergent flap pivot connections to a pin connection on said divergent flap means, and a fourth link from said pin connection on said ejector flap means to said pin connection on said divergent flap means.

5. A nozzle as in claim 4, comprising also:
   said first and fourth links being of equal length, and said second and third links being of equal length.

6. A nozzle as in claim 2, comprising also:
   said link means comprising a four bar linkage comprised of a first link from said divergent flap pivot connections to said ejector flap pivot connections;
   a second link from said ejector flap pivot connections to a pin connection on said ejector flap means, a third link from said divergent flap pivot connections to a pin connection on said divergent flap means, and a fourth link from said pin connection on said ejector flap means to said pin connection on said divergent flap means.

7. A nozzle as in claim 6, comprising also:
   said first and fourth links being of equal length, and said second and third links being of equal length.

8. A nozzle as in claim 3, comprising also:
   said link means comprising a four bar linkage comprised of a first link from said divergent flap pivot connections to said ejector flap pivot connections;
   a second link from said ejector flap pivot connections to a pin connection on said ejector flap means, a third link from said divergent flap pivot connections to a pin connection on said divergent flap means, and a fourth link from said pin connection on said ejector flap means to said pin connection on said divergent flap means.

9. A nozzle as in claim 8, comprising also:
   said first and fourth links being of equal length, and said second and third links being of equal length.

* * * * *